United States Patent
Yoshida et al.

(10) Patent No.: US 12,488,101 B2
(45) Date of Patent: Dec. 2, 2025

(54) DETECTION DEVICE, DETECTION METHOD AND DETECTION PROGRAM

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Keigo Yoshida, Osaka (JP); Hiroyuki Tsukamoto, Osaka (JP); Shogo Kamiguchi, Yokkaichi (JP); Hiroshi Ueda, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 228 days.

(21) Appl. No.: 18/272,312

(22) PCT Filed: Dec. 24, 2021

(86) PCT No.: PCT/JP2021/048187
§ 371 (c)(1),
(2) Date: Jul. 13, 2023

(87) PCT Pub. No.: WO2022/153839
PCT Pub. Date: Jul. 21, 2022

(65) Prior Publication Data
US 2024/0152607 A1    May 9, 2024

(30) Foreign Application Priority Data

Jan. 14, 2021  (JP) ................................. 2021-004081
Apr. 28, 2021  (JP) ................................. 2021-076385

(51) Int. Cl.
*G06F 21/55*    (2013.01)

(52) U.S. Cl.
CPC ................................. *G06F 21/554* (2013.01)

(58) Field of Classification Search
CPC ......... H04L 12/22; H04L 12/28; H04L 43/08; G06F 21/554
See application file for complete search history.

(56) References Cited

U.S. PATENT DOCUMENTS 11,575,538 B2 *   2/2023   Takahashi ......... B60W 50/0205
2019/0149562 A1 * 5/2019   Maeda ................... G06N 20/00
                                                          726/23
(Continued)

FOREIGN PATENT DOCUMENTS

WO    2015-159486 A1    10/2015

OTHER PUBLICATIONS

Yoshida, Keigo et al. A Study on Anomaly Detection of Periodic Services for SOME/IP. Proceeding nof the 2021 Symposium on Cryptography and Information Security, Jan. 19, 2021, pp. 1-8.
(Continued)

*Primary Examiner* — Benjamin M Thieu
(74) *Attorney, Agent, or Firm* — Honigman LLP

(57) ABSTRACT

The detection device that detects presence of an unauthorized message in an in-vehicle network, the detection device includes: a state detection unit configured to detect a transition to a state in which a periodic message is transmitted in an in-vehicle network, based on content of a message transmitted in the in-vehicle network; and a processing unit configured to perform detection processing to detect presence of the unauthorized message based on a reception status of a plurality of the periodic messages in the state detected by the state detection unit.

11 Claims, 13 Drawing Sheets

(56) References Cited

U.S. PATENT DOCUMENTS

| | | | |
|---|---|---|---|
| 2019/0239221 A1* | 8/2019 | Ujiie | H04L 12/28 |
| 2020/0216097 A1* | 7/2020 | Galula | G06F 21/51 |
| 2020/0342099 A1* | 10/2020 | Kerstein | H04L 63/1425 |
| 2021/0153194 A1 | 5/2021 | Ujiie et al. | |
| 2022/0242419 A1* | 8/2022 | Davidovich | B60W 40/105 |

OTHER PUBLICATIONS

Gehrmann, T. et al., Intrusion Detection for SOME/IP : Challenges and Opportunities. Proceedings of the 23rd Euromicro Conference on Digital System Design (DSD2020), Aug. 26, 2020, pp. 583-587.
International Search Report, Application No. PCT/JP2021/048187, mailed Mar. 1, 2022. ISA/Japan Patent Office.

* cited by examiner

FIG. 4

| FUNCTION | USED MESSAGE |
|---|---|
| Service Discovery | Find Service |
| | Offer Service |
| Publish/Subscribe | Subscribe Eventgroup |
| | Subscribe Eventgroup Ack |
| | Notification |
| RPC (Remote Procedure Call) | Request |
| | Responce |

FIG. 7

| SOME/IP FUNCTION | STATEFUL MESSAGE | | MONITORED MESSAGE |
| --- | --- | --- | --- |
| | MESSAGE TRANSMITTED IMMEDIATELY BEFORE START OF PERIODIC STATE | MESSAGE TRANSMITTED IMMEDIATELY BEFORE END OF PERIODIC STATE | |
| Service Discovery | Offer Service | Stop Offer Service | Offer Service |
| | Find Service | Offer Service | Find Service |
| RPC | Offer Service | Stop Offer Service | Request |
| | Offer Service | | Responce |
| Publish/Subscribe | Subscribe Eventgroup Ack | Stop Offer Service OR Stop Subscribe Eventgroup | Notification |

DETECTION DEVICE, DETECTION METHOD AND DETECTION PROGRAM

CROSS-REFERENCE TO RELATED APPLICATIONS

This application is the U.S. national stage of PCT/JP2021/048187 filed on Dec. 24, 2021, which claims priority of Japanese Patent Application Nos. JP 2021-004081 filed on Jan. 14, 2021 and JP 2021-076385, filed on Apr. 28, 2021, the contents of which are incorporated herein.

TECHNICAL FIELD

The present disclosure relates to a detection device, a detection method, and a detection program.

BACKGROUND

WO 2019/021402 A1 discloses a communication device as follows. Specifically, the communication device is disposed in an automobile and connected to a network bus used for communication by a plurality of electronic control devices, and includes a reception unit that receives messages transmitted from the electronic control devices via the network bus, a list holding unit that holds a list including a determination criterion related to a predetermined field indicating a transfer range of the message, and a determination unit that determines the validity of the message by performing a comparison between the message and the list.

The communication device described in WO 2019/021402 A1 can detect an unauthorized message by comparing the value of a predetermined field included in the message with a determination criterion registered in advance in a list. However, there is a problem that if an unauthorized message satisfying the determination criterion registered in the list is present, that unauthorized message cannot be detected.

The present disclosure has been made to solve the aforementioned problems, and an object of the present disclosure is to provide a detection device, a detection method, and a detection program that can more accurately detect the presence of an unauthorized message in an in-vehicle network.

SUMMARY

Conventionally, technology has been developed to improve security in an in-vehicle network.

A detection device according to the present disclosure is a detection device that detects presence of an unauthorized message in an in-vehicle network, the detection device including: a state detection unit configured to detect a transition to a state in which a periodic message is transmitted in an in-vehicle network, based on content of a message transmitted in the in-vehicle network; and a processing unit configured to perform detection processing to detect presence of the unauthorized message based on a reception status of a plurality of the periodic messages in the state detected by the state detection unit.

A detection method according to the present disclosure is a detection method performed in a detection device that detects presence of an unauthorized message in an in-vehicle network, the detection method including the steps of detecting a transition to a state in which a periodic message is transmitted in an in-vehicle network, based on content of a message transmitted in the in-vehicle network; and detecting presence of the unauthorized message based on a reception status of a plurality of the periodic messages in the detected state.

A detection program according to the present disclosure is a detection program for use in a detection device that detects presence of an unauthorized message in an in-vehicle network, the detection program causing a computer to function as: a state detection unit configured to detect a transition to a state in which a periodic message is transmitted in an in-vehicle network, based on content of a message transmitted in the in-vehicle network; and a processing unit configured to perform detection processing to detect presence of the unauthorized message based on a reception status of a plurality of the periodic messages in the state detected by the state detection unit.

One aspect of the present disclosure can be realized not only as a detection device that includes such characteristic processing units, but also as a semiconductor integrated circuit that realizes a part or the entirety of the detection device, or a detection system that includes the detection device.

Effects

With the present disclosure, the presence of an unauthorized message in an in-vehicle network can be detected more accurately

BRIEF DESCRIPTION OF THE DRAWINGS

FIG. 4 is a diagram illustrating SOME/IP functions used in the in-vehicle network according to this embodiment of the present disclosure.

FIG. 7 is a diagram for describing a message that includes specific content used for state detection performed by the gateway device according to this embodiment of the present disclosure, and a monitored message.

DETAILED DESCRIPTION OF PREFERRED EMBODIMENTS

Figure 1:
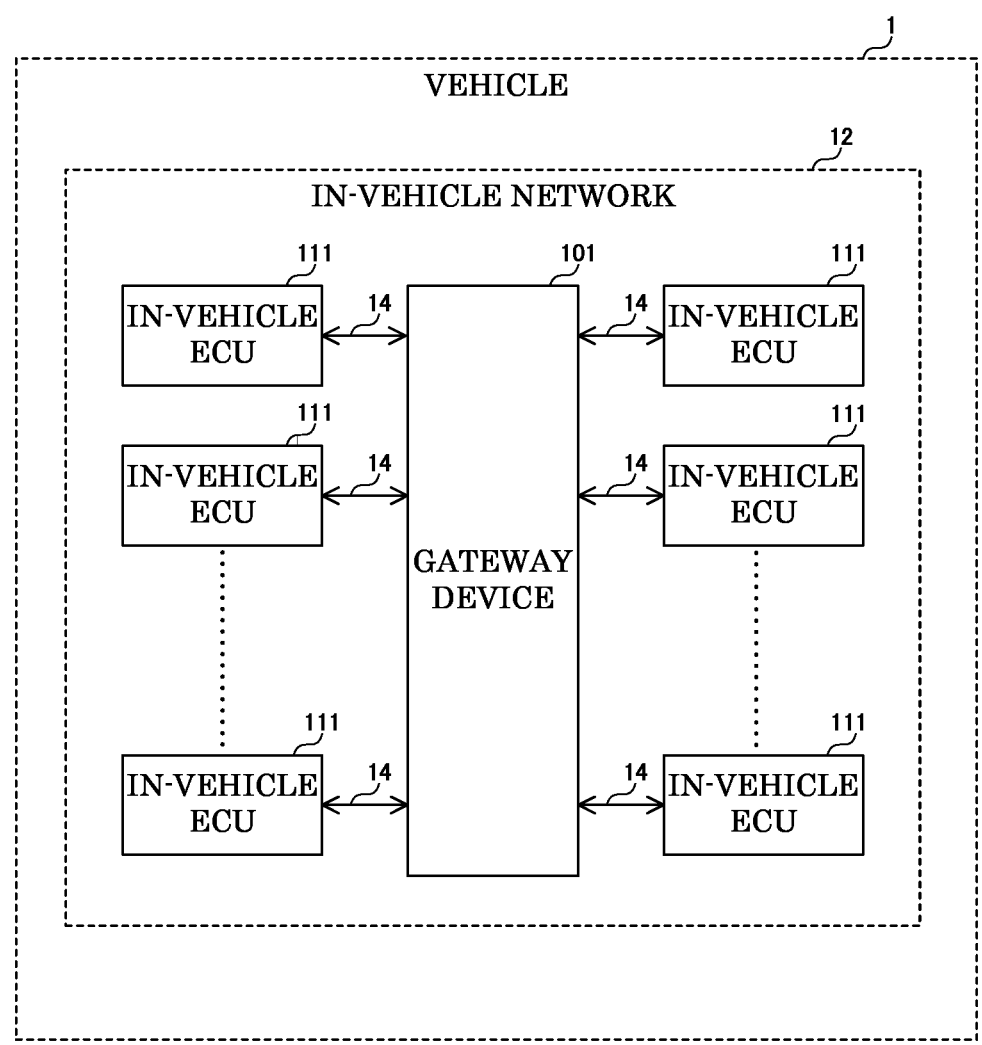
FIG. 1 is a diagram showing the configuration of an in-vehicle network according to an embodiment of the present disclosure.

First, the details of an embodiment of the present disclosure are listed and described.

A detection device according to an embodiment of the present disclosure is a detection device that detects presence of an unauthorized message in an in-vehicle network, the detection device including: a state detection unit configured to detect a transition to a state in which a periodic message is transmitted in an in-vehicle network, based on content of a message transmitted in the in-vehicle network; and a processing unit configured to perform detection processing to detect presence of the unauthorized message based on a reception status of a plurality of the periodic messages in the state detected by the state detection unit.

In this way, the detection device is configured to detect a transition to a state in which a periodic message is transmitted, and detect the presence of an unauthorized message based on the reception status of a plurality of periodic messages in the detected state, and therefore even if an unauthorized message having the same ID or the like as a periodic message is transmitted between normal periodic messages, it is possible to detect the presence of that unauthorized message, for example. This make it possible to more accurately detect the presence of an unauthorized message in the in-vehicle network.

A configuration is possible in which, in the detection processing, the processing unit detects the unauthorized message based on a reception interval of the periodic messages.

According to this configuration, an unauthorized message can be easily detected by detecting a change in the reception interval of periodic messages, for example. Also, even if the reception frequency of unauthorized messages is low, the unauthorized messages can be detected.

A configuration is possible in which, in the detection processing, the processing unit calculates a difference between the reception interval and a transmission period corresponding to the periodic message for each type of the periodic message, and, in a case where the calculated difference is greater than or equal to a predetermined threshold value, the processing unit determines that the unauthorized message is present.

According to this configuration, even in a situation in which multiple types of periodic messages are transmitted in the in-vehicle network, the various types of periodic messages can be monitored in parallel using transmission period values that respectively correspond to the various types of periodic messages, and it is possible to more accurately detect an unauthorized message.

A configuration is possible in which the threshold value is set based on variation in a transmission period of the periodic messages analyzed based on a measurement result in a vehicle in which the in-vehicle network is provided.

According to this configuration, the threshold value can be set to an appropriate value with use of the transmission period of periodic messages observed in advance in the vehicle, thus making it possible to more accurately detect an unauthorized message.

A configuration is possible in which the periodic message can be divided and transmitted in a plurality of frames in the in-vehicle network, and the processing unit detects the unauthorized message based on a reception interval of frames at the same place in a division sequence.

According to this configuration, if a normal periodic message is divided and transmitted in a plurality of frames, an unauthorized message transmitted between such frames can be detected.

A configuration is possible in which the processing unit performs the detection processing based on a reception frequency of frames that include part or all of the periodic message.

According to this configuration, by detecting a change in the reception frequency of frames that include part or all of a periodic message, for example, it is possible to easily detect the presence of an unauthorized message. Also, there are situations in which a periodic message is divided and transmitted in a plurality of frames, for example, and if the presence or absence of an unauthorized message is determined on a frame-by-frame basis, then there may be cases where the presence of an unauthorized message is erroneously detected due to a frame not being received in accordance with a predetermined period, but according to the configuration described above, the periodicity is determined on a message-by-message basis in the application layer, thus making it possible to more accurately detect the presence of an unauthorized message.

A configuration is possible in which the detection device further includes a relay unit configured to relay a message between a plurality of in-vehicle devices in the in-vehicle network, wherein the relay unit does not relay the unauthorized message detected by the processing unit.

According to this configuration, it is possible to prevent an unauthorized message from being transmitted to an in-vehicle device that is the relay destination.

A configuration is possible in which the state detection unit detects the transition to the state, in a case where a specific message was received, and the specific message is a message compliant with SOME/IP (Scalable service-Oriented MiddlewarE over IP).

According to this configuration, it is possible to accurately detect a transition to a state in which periodic messages are transmitted in a sequence compliant with SOME/IP, for example.

A configuration is possible in which the detection device further includes an output unit configured to perform at least one of storing information regarding the unauthorized message and outputting a warning, in a case where presence of the unauthorized message was detected by the processing unit.

According to this configuration, a user or the like can recognize the presence of an unauthorized message and take an appropriate countermeasure against the unauthorized message, for example.

A detection method according to an embodiment of the present disclosure is a detection method performed in a detection device that detects presence of an unauthorized message in an in-vehicle network, the detection method including the steps of detecting a transition to a state in which a periodic message is transmitted in an in-vehicle network, based on content of a message transmitted in the in-vehicle network; and detecting presence of the unauthorized message based on a reception status of a plurality of the periodic messages in the detected state.

In this way, the detection method is configured to detect a transition to a state in which a periodic message is transmitted, and detect the presence of an unauthorized message based on the reception status of a plurality of periodic messages in the detected state, and therefore even if an unauthorized message having the same ID or the like as a periodic message is transmitted between normal periodic messages, it is possible to detect the presence of that unauthorized message, for example. This make it possible to more accurately detect the presence of an unauthorized message in the in-vehicle network.

A detection program according to an embodiment of the present disclosure is a detection program for use in a detection device that detects presence of an unauthorized message in an in-vehicle network, the detection program causing a computer to function as: a state detection unit configured to detect a transition to a state in which a periodic message is transmitted in an in-vehicle network, based on content of a message transmitted in the in-vehicle network; and a processing unit configured to perform detection processing to detect presence of the unauthorized message based on a reception status of a plurality of the periodic messages in the state detected by the state detection unit.

In this way, the detection program is configured to detect a transition to a state in which a periodic message is transmitted, and detect the presence of an unauthorized message based on the reception status of a plurality of periodic messages in the detected state, and therefore even if an unauthorized message having the same ID or the like as a periodic message is transmitted between normal periodic messages, it is possible to detect the presence of that unauthorized message, for example. This make it possible to more accurately detect the presence of an unauthorized message in the in-vehicle network.

Hereinafter, embodiments of the present disclosure will be described with reference to the drawings. Note that, in the drawings, the same reference numerals are given to the same or corresponding components in the drawings, and redundant descriptions thereof are not repeated. Furthermore, at least parts of the embodiments described below may be suitably combined.

Configuration and Basic Operation

FIG. 1 is a diagram showing the configuration of an in-vehicle network according to an embodiment of the present disclosure.

As shown in FIG. 1, an in-vehicle network 12 includes a gateway device 101 and a plurality of in-vehicle ECUs (Electronic Control Units) 111, which are in-vehicle devices. The gateway device 101 and the in-vehicle ECUs 111 are installed in a vehicle 1.

Examples of the in-vehicle ECUs 111 include an electric power steering (EPS) device, a brake control device, an accelerator control device, a steering control device, a driving assistance device that give instructions or the like to various devices in an advanced driver-assistance system (ADAS), and various sensors.

The gateway device 101 is a central gateway (CGW), for example, and can communicate with other in-vehicle devices. The gateway device 101 performs relay processing for relaying information exchanged between in-vehicle ECUs 111 connected to different buses 14 in the vehicle 1, for example. The buses 14 are compliant with the Ethernet (registered trademark) standard, for example.

Figure 2:
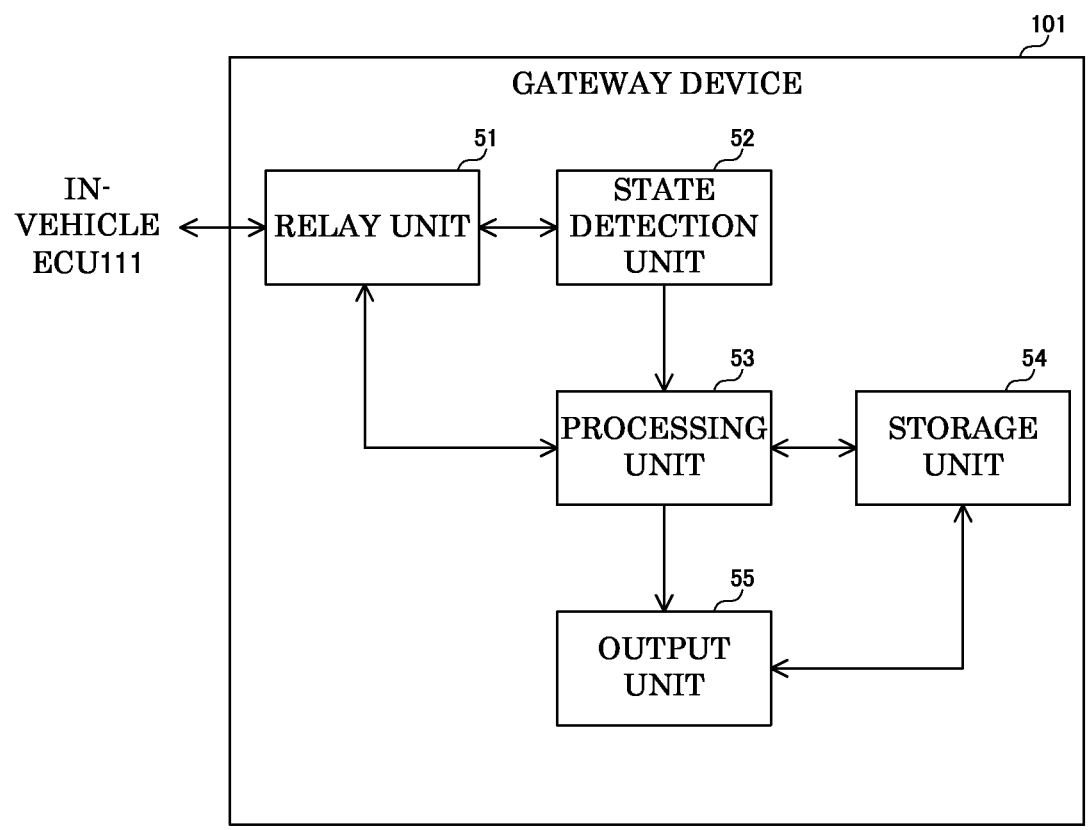
FIG. 2 is a diagram showing the configuration of the gateway device according to this embodiment of the present disclosure.

FIG. 2 is a diagram showing the configuration of the gateway device according to this embodiment of the present disclosure.

As shown in FIG. 2, the gateway device 101 includes a relay unit 51, a state detection unit 52, a processing unit 53, a storage unit 54, and an output unit 55. The relay unit 51, the state detection unit 52, the processing unit 53, and the output unit 55 are implemented by a processor such as a CPU (Central Processing Unit) or a DSP (Digital Signal Processor). The storage unit 54 is a non-volatile memory, for example.

The gateway device 101 functions as a detection device, for example, and performs detection processing for detecting the presence of an unauthorized message in the in-vehicle network 12.

The relay unit 51 performs relay processing for relaying messages transmitted between the in-vehicle ECUs 111 in the in-vehicle network 12. For example, upon receiving a message from a certain in-vehicle ECU 111 via a corresponding bus 14, the relay unit 51 transmits the message to another in-vehicle ECU 111 via a corresponding bus 14.

The state detection unit 52 performs state detection for detecting, based on the content of messages transmitted in the in-vehicle network 12, a transition to a state in which periodic messages are transmitted in the in-vehicle network 12 (hereinafter, also referred to as the "periodic state").

In this example, in the in-vehicle network 12, messages are transmitted and received in compliance with SOME/IP (Scalable service-Oriented MiddlewarE over IP), which is an application layer protocol in the Ethernet protocol group.

As a specific example, consider the case where a sensor, which is one of the in-vehicle ECUs 111, transmits sensor information regarding the traveling state of the vehicle 1 or the surrounding state of the vehicle 1 to a driving assistance device, which is another one of the in-vehicle ECUs 111. In this case, the sensor transmits sensor information to the driving assistance device as provision of a service. The driving assistance device receives the sensor information provided as a service from the sensor, uses the sensor information to generate various types of control information regarding driving of the vehicle 1, and transmits the generated control information to a brake control device, a steering control device, and the like, thus realizing an application for safe driving assistance or the like.

Hereinafter, an in-vehicle ECU 111 that provides a service will also be referred to as a "server". Also, an in-vehicle ECU 111 that receives the service will also be referred to as a "client".

More specifically, a server stores a message, which includes sensor information or the like provided as a service, in one or more frames, and transmits the one or more frames to a client in compliance with SOME/IP. The message is given a service ID (service identifier, which is hereinafter referred to as a "service ID"), for example.

Examples of messages compliant with SOME/IP include periodic messages that are periodically transmitted between in-vehicle ECUs 111, and messages that are irregularly transmitted between in-vehicle ECUs 111.

The state detection unit 52 monitors messages relayed by the gateway device 101, that is to say frames containing messages received by the relay unit 51, and checks the content of the messages by referencing the SOME/IP headers of the frames.

If a message includes specific content that is transmitted immediately before the start of transmission of periodic messages between a client and a server, the state detection unit 52 determines that the state between the client and the server will transition to the periodic state. The state detection unit 52 then notifies the processing unit 53 of the service ID of the message and the detection result indicating transition to the periodic state.

On the other hand, if the content of the message is content other than the above-described specific content, the state detection unit 52 determines that the state between the client and the server will not transition to the periodic state.

Also, if the message received by the relay unit 51 is a message that includes other specific content that is transmitted immediately before the end of the transmission of periodic messages between the client and the server, the state detection unit 52 determines that the periodic state between the client and the server will end. The state detection unit 52 then notifies the processing unit 53 of the service ID of the message and the detection result indicating the end of the periodic state. The state detection performed by the state detection unit 52 will be described in detail later.

The processing unit 53 performs detection processing for detecting the presence of an unauthorized message in the in-vehicle network 12 based on the reception status of a plurality of periodic messages in the periodic state detected by the state detection unit 52.

Specifically, upon receiving notification of the detection result indicating a transition to the periodic state and a service ID from the state detection unit 52, the processing unit 53 starts detection processing for detecting an unauthorized message that has intruded into the in-vehicle network 12 from an external network, for example.

More specifically, in the detection processing performed by the processing unit 53, the monitored message is a message that is a periodic message received by the relay unit 51, includes specific content, and has the same service ID as the service ID notified by the state detection unit 52.

The processing unit 53 performs this unauthorized message detection processing based on the reception interval of the monitored message or the frequency of reception of frames that include part or all of the monitored message, for example.

Also, upon detecting an unauthorized message, the processing unit 53 instructs the relay unit 51 to discard the frame that includes the unauthorized message, for example. Upon receiving a frame discard instruction from the processing unit 53, the relay unit 51 discards the corresponding frame. As a result, the unauthorized message is not relayed by the relay unit 51. Also, the processing unit 53 outputs, to the output unit 55, information regarding the unauthorized message, such as the corresponding service ID and the frame reception time.

Also, upon receiving notification of the detection result indicating the end of the periodic state and a service ID from the state detection unit 52, the processing unit 53 ends detection processing for detecting the unauthorized message that has the corresponding service ID. The detection processing performed by the processing unit 53 will be described in detail later.

Upon receiving information regarding an unauthorized message from the processing unit 53, the output unit 55 stores the information in the storage unit 54, for example. Also, the output unit 55 outputs a warning indicating the detection of an unauthorized message to a user terminal or the like via an in-vehicle ECU 111 that includes a wireless communication function.

Note that the gateway device 101 may have a configuration in which the output unit 55 is not provided.

Also, in the embodiment of the present disclosure, the gateway device 101 is configured to perform detection processing for detecting an unauthorized message in the in-vehicle network 12, but the configuration is not limited to this. In the in-vehicle network 12, a device other than the gateway device 101 may be configured as a detection device that performs unauthorized message detection processing. In this case, the detection device may be connected to a predetermined port of the gateway device 101, such as a mirror port.

Also, in the embodiment of the present disclosure, the gateway device 101 functioning as a detection device is directly connected to the buses 14, but the configuration is not limited to this.

Figure 3:
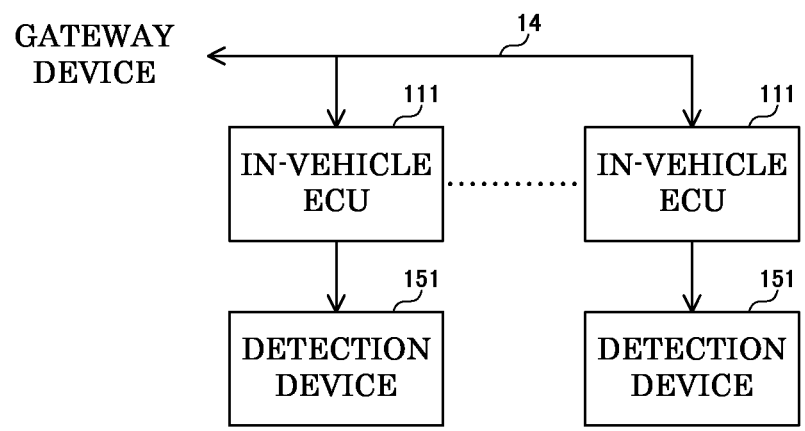
FIG. 3 is a diagram showing an example of the connection topology of the in-vehicle network according to this embodiment of the present disclosure.

FIG. 3 is a diagram showing an example of the connection topology of the in-vehicle network according to this embodiment of the present disclosure.

As shown in FIG. 3, detection devices 151 may be connected to a bus 14 via in-vehicle ECUs 111. In this case, the detection devices 151 detect unauthorized messages transmitted to the bus 14 by monitoring messages transmitted and received by the in-vehicle ECUs 111, for example.

In the example shown in FIG. 3, the detection devices 151 include the state detection unit 52 and the processing unit 53 described above.

Figure 5:
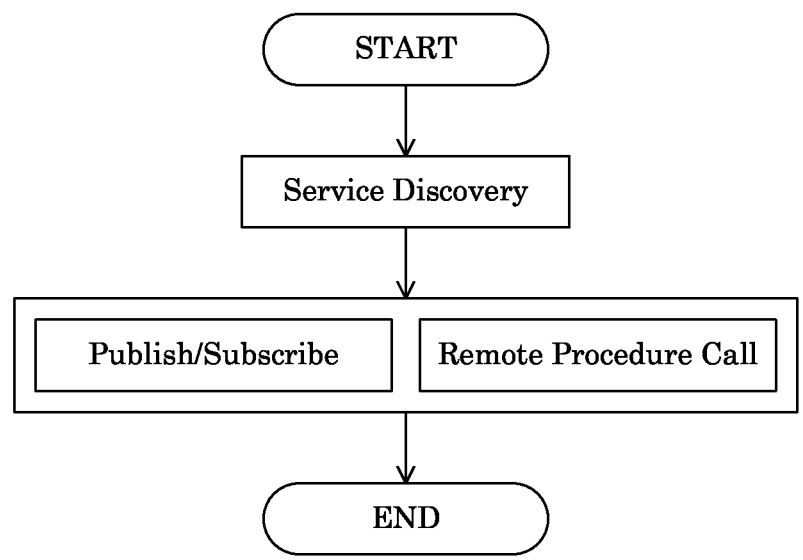
FIG. 5 is a diagram illustrating SOME/IP functions used in the in-vehicle network according to this embodiment of the present disclosure.

FIGS. 4 and 5 are diagrams illustrating SOME/IP functions used in the in-vehicle network according to this embodiment of the present disclosure.

As shown in FIGS. 4 and 5, in communication compliant with SOME/IP, three functions for providing a service in the in-vehicle network 12 can be executed, namely "Service Discovery", "Publish/Subscribe", and "RPC (Remote Procedure Call)".

The Service Discovery function enables a client to search for a server that provides a service, and establish a communication connection between the client and the server.

For example, in the case where a service is to be received, an in-vehicle ECU 111 broadcasts, as a client, a Find Service (hereinafter abbreviated as "Find") message that includes the service ID that corresponds to the service to be received. The Find message is given a client ID or the like.

If an in-vehicle ECU 111 that receives the Find message is able to provide the service that corresponds to the service ID included in the Find message, that in-vehicle ECU 111 transmits, as a server, an Offer Service (hereinafter abbreviated as "Offer") message, which indicates the start of service provision, to the sender of the Find message. The Offer message is given a server ID or the like. This enables a communication connection to be established between the client and the server.

The Find message and the Offer message may be transmitted periodically or irregularly. In the case where the Find message is a periodic message, the transmission period is determined in advance in accordance with the SOME/IP specification, for example. Also, in the case where the Offer message is a periodic message, the transmission period is determined in advance in accordance with the SOME/IP specification, for example.

The Publish/Subscribe function enables a client to request provision of a periodic service from a specific server.

For example, the client uses a server ID acquired by Service Discovery to transmit a Subscribe Eventgroup (hereinafter abbreviated as "Subscribe"), which is a message that includes the corresponding server ID and a service ID, to the corresponding server.

Upon receiving the Subscribe, the server checks the service ID included in the Subscribe. If the service ID matches a service ID corresponding to a service that can be provided, the server transmits, to the client, a Subscribe Eventgroup Ack (hereinafter abbreviated as "Subscribe Ack"), which is a message indicating approval of service provision. The server then performs service provision, in which a Notification, which is a message compliant with SOME/IP, is periodically transmitted to the client.

The Notification transmission period is determined in advance by the manufacturer of the vehicle 1, for example.

In the case of stopping reception of the service, the client transmits a Stop Subscribe Eventgroup (hereinafter abbreviated as "Stop Subscribe") to the server. Upon receiving the Stop Subscribe, the server stops transmission of the Notification.

Also, in the case where the server stops service provision, the server transmits a Stop Offer Service (hereinafter abbreviated as "Stop Offer") to the client.

The RPC function enables a client to request a specific server to provide a service.

For example, the client uses the server ID acquired by Service Discovery to transmit a Request, which is a message that includes the service ID, and the service ID to the corresponding server.

Upon receiving the Request, the server checks the service ID attached to the Request. If the service ID matches a service ID corresponding to a service that can be provided, the server approves the provision of the service. The server then transmits a Response to the client.

The Request and Response may be transmitted periodically or may be transmitted irregularly. If the Request is a periodic message, the transmission period is determined in advance by the manufacturer of the vehicle 1, for example. Also, if the Response is a periodic message, the transmission period is determined in advance by the manufacturer of the vehicle 1, for example.

Figure 6:
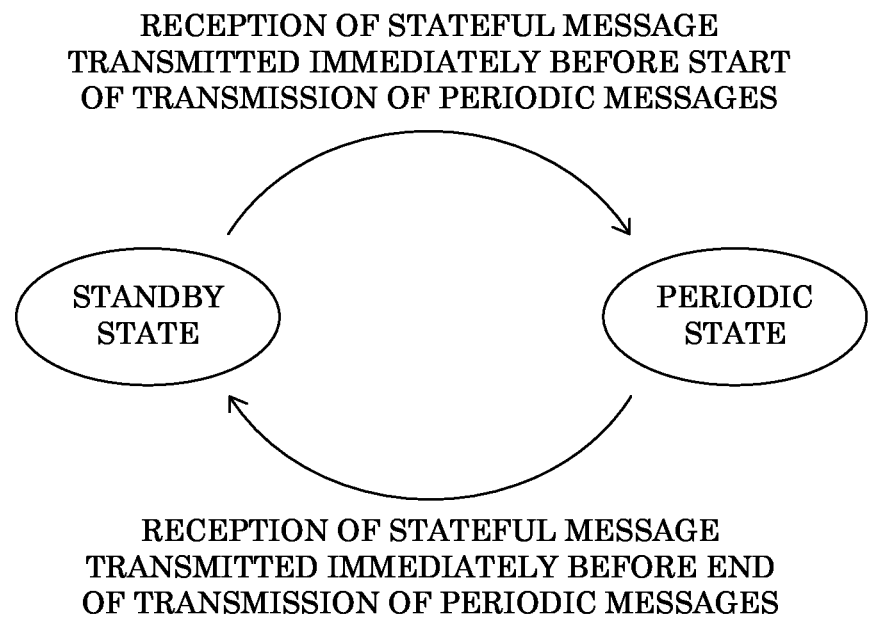
FIG. 6 is a diagram for describing states between a client and a server detected by the gateway device according to this embodiment of the present disclosure.

FIG. 6 is a diagram for describing states between a client and a server detected by the gateway device according to this embodiment of the present disclosure.

FIG. 7 is a diagram for describing a message that includes specific content used for state detection performed by the gateway device according to this embodiment of the present disclosure, and a monitored message. Hereinafter, a message that is used for state detection and includes specific content that is dependent on a sequence compliant with SOME/IP will also be referred to as a "stateful message".

As shown in FIGS. 6 and 7, consider the case where the state between the client and the server is a standby state, which is a state that is not a periodic state. In this case, the state detection unit 52 checks whether or not the message included in a frame received by the relay unit 51 is a stateful message that is transmitted immediately before the start of transmission of periodic messages.

Here, consider the case where the Find message and the Offer message in Service Discovery are periodic messages, and the Request and the Response in RPC are periodic messages.

If the message included in the frame is an Offer message, which is a stateful message, the state detection unit 52 determines that the state will transition to a periodic state in which an Offer message, a Request, or a Response is periodically transmitted, as shown in FIG. 7. The state detection unit 52 then notifies the processing unit 53 of the transition to a periodic state due to the reception of the Offer message, and also the service ID attached to the Offer message.

Also, if the message included in the frame is a Find message, which is a stateful message, the state detection unit 52 determines that the state will transition to a periodic state in which the Find message is periodically transmitted. The state detection unit 52 then notifies the processing unit 53 of the transition to the periodic state due to the reception of the Find message, and also the service ID attached to the Find message.

Also, as shown in FIG. 6, if the state between the client and the server is a periodic state, the state detection unit 52 checks whether the message included in a frame received by the relay unit 51 is a stateful message that is transmitted immediately before the end of transmission of periodic messages.

For example, consider the case where the state detection unit 52 determines that the state will transition to a periodic state due to the reception of the Offer message, and then detects that the relay unit 51 received a Stop Offer, which is a stateful message. In this case, the state detection unit 52 determines that the periodic state will end, and notifies the processing unit 53 of the fact that the periodic state will end due to the reception of the Stop Offer, and also the service ID attached to the Stop Offer.

Now consider the case where the state detection unit 52 determines that the state will transition to a periodic state due to the reception of the Find message, and then detects that the relay unit 51 received an Offer message, which is a stateful message. In this case, the state detection unit 52 determines that the periodic state will end due to the reception of the Offer message, and notifies the processing unit 53 of the end of the periodic state and the service ID attached to the Offer message.

As described above, in Publish/Subscribe, when a Subscribe Ack is sent from the server to the client, the state transitions to a periodic state in which a Notification, which is a periodic message, is periodically transmitted.

Therefore, if the state between the client and the server is the standby state, and the message included in the frame received by the relay unit 51 is a Subscribe Ack, which is a stateful message, the state detection unit 52 determines that the state will transition to a periodic state in which a Notification is periodically transmitted. The state detection unit 52 then notifies the processing unit 53 of the transition to the periodic state due to the reception of the Subscribe Ack, and also the service ID attached to the Subscribe Ack.

Also, as described above, in Publish/Subscribe, when a Stop Offer is transmitted from the server or a Stop Subscribe is transmitted from the client, the periodic state ends.

For example, consider the case where the state detection unit 52 determines that the state will transition to a periodic state due to the reception of a Subscribe Ack, and then detects that a Stop Offer or a Stop Subscribe, which are stateful messages, was received by the relay unit 51.

In this case, the state detection unit 52 determines that the periodic state will end, and notifies the processing unit 53 of the end of the periodic state due to the reception of the Stop Offer or the Stop Subscribe, and also the service ID attached to the Stop Offer or the Stop Subscribe.

In one example, upon receiving a notification of a transition to a periodic state due to the reception of the Offer message, for example, the processing unit 53 performs unauthorized message detection processing in which the monitored messages are an Offer message, a Request, and a Response (periodic messages) that include the notified service ID, as shown in FIG. 7.

As another example, upon receiving a notification of a transition to a periodic state due to the reception of a Subscribe Ack, the processing unit 53 performs unauthorized message detection processing in which the monitored message is a Notification (periodic message) that includes the notified service ID.

If multiple sequences compliant with SOME/IP are executed in parallel between one set of in-vehicle ECUs 111 or two or more sets of the same, the processing unit 53 can monitor multiple types of monitored messages in parallel based on the client IDs, service IDs, and the like attached to messages received by the relay unit 51.

For example, in the case of referencing the SOME/IP header of frames received by the relay unit 51 and detecting that the frames are monitored messages, the processing unit 53 calculates a reception interval D of the monitored messages.

More specifically, if the relay unit 51 receives a frame that includes a monitored message, the processing unit 53 stores a reception time t of that frame in the storage unit 54 in correspondence with the type of monitored message, for example.

Then, if a new frame that includes a monitored message is received, for example, the processing unit 53 calculates the monitored message reception interval D by calculating the difference between the reception time t of the new frame and the reception time t of the immediately previous frame that includes a monitored message of the same type as the monitored message in the new frame but was not determined to include an unauthorized message in a later-described method.

Figure 8:
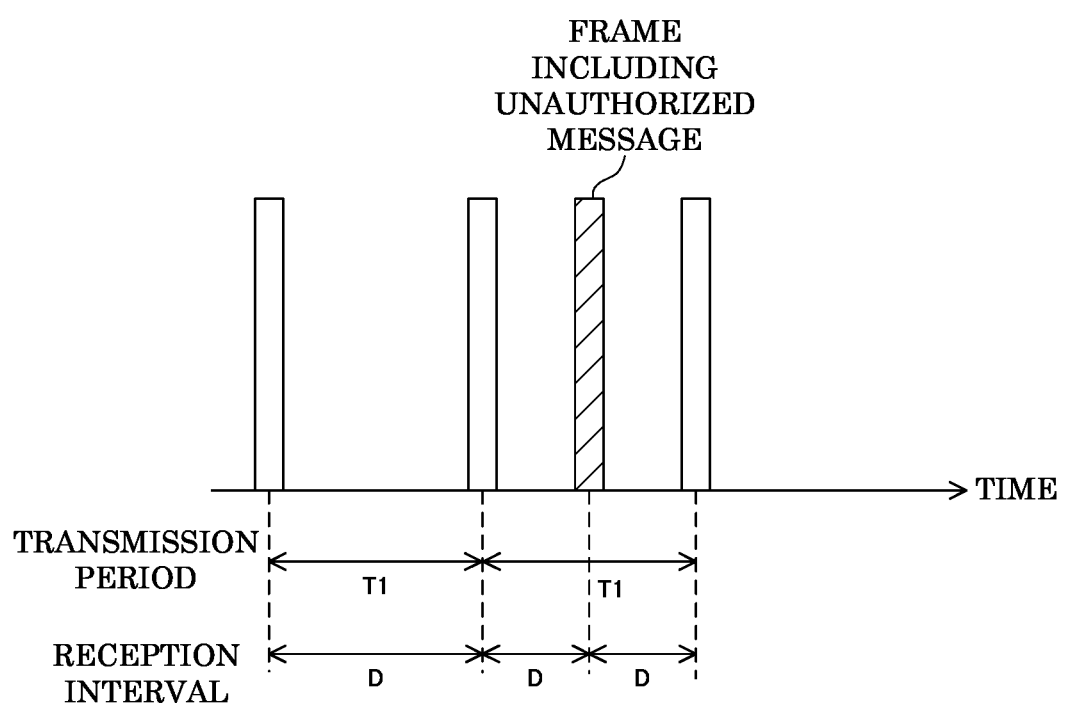
FIG. 8 is a diagram for describing the monitored message reception interval calculated by the gateway device according to this embodiment of the present disclosure.

Here, the monitored message reception interval D will be described with reference to the drawings. FIG. 8 is a diagram for describing the monitored message reception interval calculated by the gateway device according to this embodiment of the present disclosure.

As shown in FIG. 8, the storage unit 54 stores correspondence information indicating the correspondence between IDs and periodic message transmission periods T1 for each service, for example.

The processing unit 53 detects an unauthorized message by, for example, comparing the calculated reception interval D of monitored messages with the transmission period T1 of the service that corresponds to the monitored messages, which is indicated by the correspondence information.

Specifically, if the frames received by relay unit 51 are all normal frames, all of the calculated reception intervals D have substantially the same value as the corresponding transmission period T1. On the other hand, if an unauthorized frame is included among the frames received by the relay unit 51, one or more of the calculated reception intervals D will have a significant difference from the corresponding transmission period T1.

For this reason, if the difference between a newly calculated reception interval D and the corresponding transmission period T1 is greater than or equal to a predetermined threshold value, for example, the processing unit 53 determines that the newly received frame includes an unauthorized message.

In other words, in the detection processing, for each type of periodic message that is a monitored message as described above (e.g., an Offer message, a Request, or a Response), the processing unit 53 calculates the difference between the reception interval D and the transmission period that corresponds to the type of periodic message that was received, and determines that an unauthorized message is present if the calculated difference is greater than or equal to the predetermined threshold value. The processing unit 53 determines the type using a message label that is attached to the message and indicates the type of message, for example.

As one example, the predetermined threshold value is set based on variation in the periodic message transmission period analyzed based on a log of measurement results for the vehicle 1 in which the in-vehicle network 12 is provided. For example, the log is a log of measurement results that change periodically, such as the measurement results of the vehicle speed, engine rotation speed, or accelerator depression angle. Note that the predetermined threshold value is not limited to being calculated based on actual measurement results for the vehicle 1, and may be calculated by simulation of some kind.

Also, in the case where periodic messages are transmitted in accordance with UDP (User Datagram Protocol), if frame loss occurs for some reason, the reception interval D calculated by the processing unit 53 will be K times the transmission period T1 (where K is a natural number). Therefore, a configuration is possible in which, for example, even in the case where the difference between the reception interval D and the transmission period T1 is greater than or equal to the predetermined threshold value, if the reception interval D is K times the transmission period T1, the processing unit 53 determines that an unauthorized message is not present.

Also, in the case where periodic messages are transmitted in accordance with TCP (Transmission Control Protocol), if a retransmission frame is present, the difference between the reception interval D and the transmission period T1 may become significant. For this reason, a configuration is possible in which, for example, in the case of detecting that a frame is a retransmission frame by referencing a specific flag such as a Push flag attached to the frame, the processing unit 53 does not use the reception time t of that retransmission frame when calculating the reception interval D.

Also, in this case, even in the case where the difference between the reception interval D and the transmission period T1 is greater than or equal to the predetermined threshold value, if the reception interval D is K times the transmission period T1, the processing unit 53 may determine that an unauthorized message is not present, for example.

Also, the processing unit 53 is not limited to performing detection processing based on the difference between the reception interval D and the transmission period T1, and may be configured to perform detection processing by comparing the reception interval D with a predetermined threshold value, for example.

For example, since the reception of an unauthorized message by the relay unit 51 occurs between the reception of one periodic message and the reception of the next periodic message, the reception interval D in the case where an unauthorized message is present takes a smaller value than in the case where an unauthorized message is not present.

For this reason, if the processing unit 53 is configured to perform detection processing by comparing the reception interval D with a predetermined threshold value, the processing unit 53 checks whether the reception interval D is less than the predetermined threshold value, and determines that an unauthorized message is present if the reception interval D is less than the predetermined threshold value.

In another example, the processing unit 53 calculates the frequency of reception of frames that include monitored messages by the relay unit 51.

Figure 9:
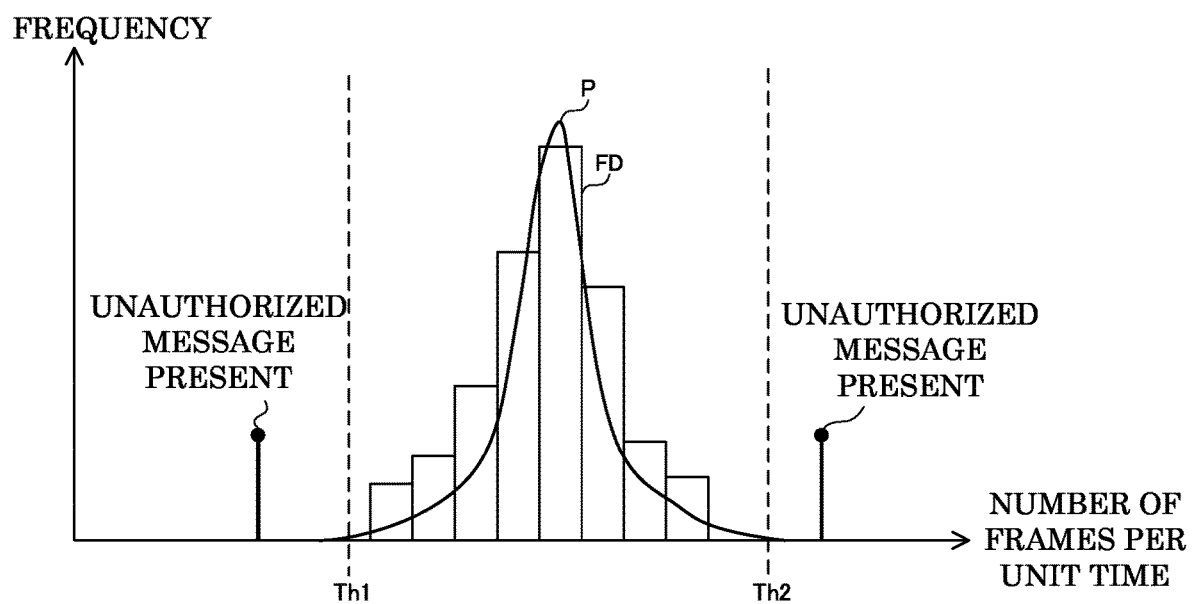
FIG. 9 is a diagram for describing the frame reception frequency calculated by the processing unit in the gateway device according to this embodiment of the present disclosure.

FIG. 9 is a diagram for describing the frame reception frequency calculated by the processing unit in the gateway device according to this embodiment of the present disclosure. In FIG. 9, the horizontal axis indicates the number of frames x per unit time, and the vertical axis indicates the frequency.

As shown in FIG. 9, as a more specific example, the processing unit 53 periodically calculates the number of monitored message frames x received by the relay unit 51 per unit time, based on the reception times t stored in the storage unit 54, and stores the calculated number of frames x in the storage unit 54.

Normally, that is to say in the case where an unauthorized message is not present in the in-vehicle network 12, the processing unit 53 generates a frequency distribution FD of the number of monitored message frames x received by the relay unit 51 in a target period Ta (predetermined period) based on the number of frames x stored in the storage unit 54, for example.

The processing unit 53 then uses a Gaussian distribution or a Gaussian mixture model to generate a probability density function P that approximates the generated frequency distribution FD, and sets threshold values Th1 and Th2 (>Th1) based on the generated probability density function P, for example.

The threshold values Th1 and Th2 are set such that the range defined by the threshold values Th1 to Th2 is approximately 98% of the range from the minimum value to the maximum value of the probability density function P on the horizontal axis, for example. Note that the processing unit 53 may be configured to update the threshold values Th1 and Th2 periodically or irregularly.

Also, in the case of calculating a new number of monitored message frames x received by the relay unit 51 per unit time, for example, the processing unit 53 checks whether the newly calculated number of frames x is outside the range of the threshold value Th1 or more and less than the threshold value Th2. If the number of frames x is out of the aforementioned range, the processing unit 53 determines that an unauthorized message is present.

Here, in the in-vehicle network 12, a periodic message can be divided and transmitted in a plurality of frames. For example, if the data length of a periodic message is longer than the data length that can be transmitted in one frame, the periodic message is divided and transmitted in a plurality of frames.

For example, if a periodic message is transmitted in compliance with UDP, the periodic message is divided into a plurality of frames in the SOME/IP layer so as to have a transmittable data length.

Also, if a periodic message is transmitted in compliance with TCP, the periodic message is divided into a plurality of frames in the TCP layer so as to have a transmittable data length. Note that the periodic message may be divided into a plurality of frames in the IP layer.

In one example, the processing unit 53 references the SOME/IP layer header, the TCP header, or the IP header of a frame received by the relay unit 51, and checks whether the frame is a frame that includes a divided portion of a monitored message.

If the frame is a frame that includes a divided portion of a monitored message, the processing unit 53 references the SOME/IP layer header, the TCP header, or the IP header of the frame and checks the place of the frame in the division sequence, for example.

More specifically, in the in-vehicle network 12, the number of portions N into which a monitored message is divided is known in advance, and the processing unit 53 checks the place of each frame in the division sequence by referencing the sequence number stored in the SOME/IP layer header, the TCP header, or the IP header of the frame, for example.

The processing unit 53 then performs unauthorized message detection processing based on the reception interval of frames at the same place in the division sequence among the frames received by the relay unit 51, for example.

Figure 10:
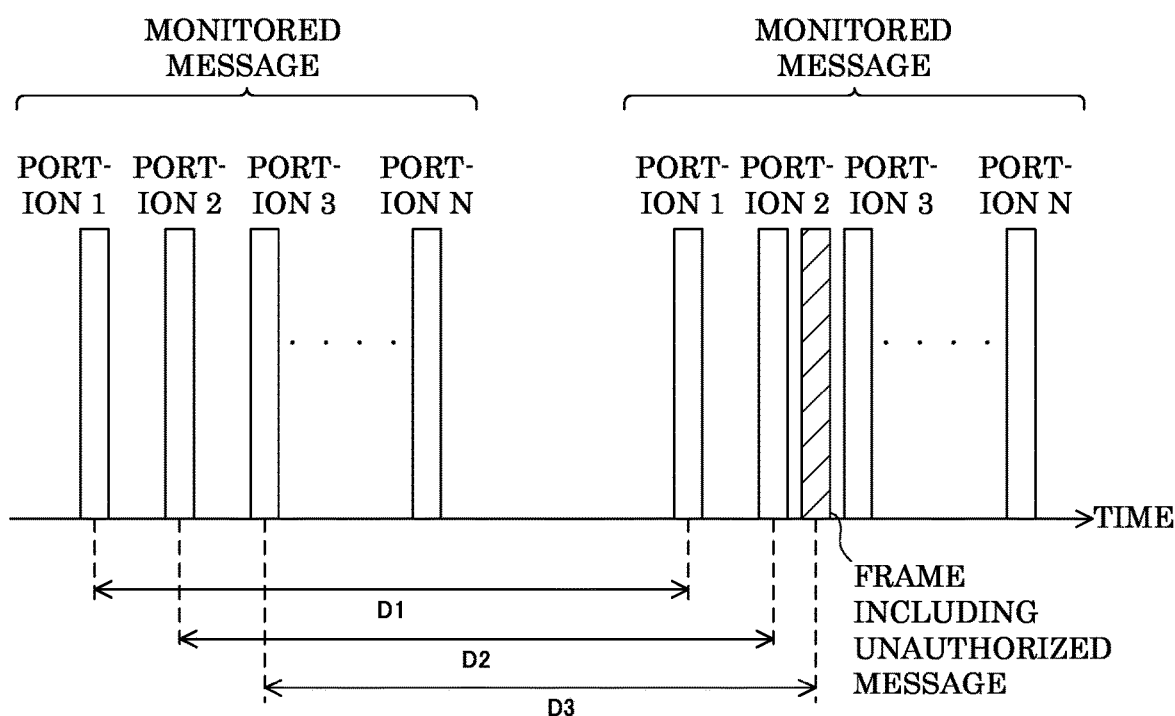
FIG. 10 is a diagram for describing the reception interval of frames that include divided portions of a monitored message, which is calculated by the gateway device according to this embodiment of the present disclosure.

FIG. 10 is a diagram for describing the reception interval of frames that include divided portions of a monitored message, which is calculated by the gateway device according to this embodiment of the present disclosure.

As shown in FIG. 10, in the case where a monitored message is divided into N frames, the relay unit 51 of the gateway device 101 receives N frames at the places 1, 2, . . . N in the division sequence.

For example, the processing unit 53 calculates the monitored message reception interval D1 by calculating the difference between the reception time t of a frame at the place "1" in the division sequence and the reception time t of the previous frame at the place "1" in the division sequence. Then, as described above, the processing unit 53 performs unauthorized message detection processing based on the difference between the calculated reception interval D1 and the corresponding transmission period T1 stored in the storage unit 54, for example.

Note that instead of performing detection processing based on the reception interval D1 between frames at the place "1" in the division sequence, the processing unit 53 may perform detection processing based on a reception interval D2 between frames at the place "2" in the division sequence, or a reception interval D3 between frames at the place "3" in the division sequence, for example.

However, in the case where a monitored message is divided and transmitted in a plurality of frames, the transmission period of frames at the place "1" in the division sequence is defined in advance, but the transmission period of frames at the place "2" or later in the division sequence is not defined. In other words, even in the case where frames at the place "2" or later in the division sequence are normal frames, there is a possibility that there will be a difference between the reception intervals D2, D3, . . . and the corresponding transmission period T1.

For this reason, it is preferable that the processing unit 53 performs detection processing based on the reception interval D1 between frames at the place "1" in the division sequence.

Also, a configuration is possible in which in the case of determining that an unauthorized message is included in a frame at the place "1" in the division sequence, the processing unit 53 determines that an unauthorized message is included in frames at the places "2" and thereafter in the division sequence, for example.

Also, as described in the section "Example 2 of Detection Processing", in the case of performing detection processing based on the reception frequency of frames, the processing unit 53 may perform detection processing based on the reception frequency of frames that include divided portions of a monitored message.

Moreover, in the in-vehicle network 12, the periodic message is not limited to being divided and transmitted in a plurality of frames, and a configuration is possible in which none of the periodic messages are divided.

Also, the processing unit 53 is not limited to being configured to perform all the types of detection processing described in the sections "Example 1 of Detection Processing" to "Example 3 of Detection Processing", and may also be configured to perform one or two of the types of detection processing described in the sections "Example 1 of Detection Processing" to "Example 3 of Detection Processing". Moreover, the processing unit 53 may be configured to perform detection processing using a method other than the methods described in the sections "Example 1 of Detection Processing" to "Example 3 of Detection Processing".

For example, a configuration is possible in which the processing unit 53 uses a technique such as MCUSUM (Multivariate Cumulative Sum) or CUSUM (Cumulative Sum), which are mainly used for quality or processing control, and determines the presence of an unauthorized message by monitoring the cumulative sum of chronological changes in the reception interval D or the cumulative sum of chronological changes in the reception frequency, and detecting a slight change in the reception status of frames that include a monitored message.

Also, a configuration is possible in which the processing unit 53 uses a technique such as EWMA (Exponentially Weighted Moving Average), and determines the presence of an unauthorized message by monitoring the exponentially weighted moving average of the reception interval D or the exponentially weighted moving average of the reception frequency, and detecting a slight change in the reception status of frames that include a monitored message.

Here, unlike CAN (Controller Area Network) communication, in Ethernet communication, a plurality of sequences compliant with SOME/IP are executed in parallel between in-vehicle ECUs 111, for example.

To address this, as described above, a configuration is employed in which the state detection unit 52 detects a transition to a periodic state by monitoring the sequences of messages between in-vehicle ECUs 111, and the processing unit 53 performs unauthorized message detection processing in the periodic state, thus making it possible to detect an unauthorized message even in a situation in which multiple sequences are executed in parallel.

As described above, if a detection result indicating the end of the periodic state is received, that is to say if the state between the client and the server transitions to the standby state, the processing unit 53 ends the unauthorized message detection processing.

Here, consider the case where a monitored message is received by the relay unit 51 in the standby state. Specifically, consider the case where a monitored message is received by the relay unit 51 before the reception of a stateful message that is transmitted immediately before the start of transmission of periodic messages.

In this case, the processing unit 53 determines that a stateful abnormality has occurred, and furthermore discards the frame that includes the monitored message, stores the determination result in the storage unit 54, and outputs the determination result to another in-vehicle device or the like via the output unit 55, for example.

Note that there is a possibility that the Find message and the Offer message are transmitted regularly. For this reason, even if the Find message or the Offer message is received by the relay unit 51 in the standby state, the processing unit 53 determines that a stateful abnormality has not occurred.

The devices in the in-vehicle network according to this embodiment of the present disclosure each have a computer that includes a memory, and in each of such devices, a computation processing unit such as a CPU in the computer reads out, from the memory, a program that includes part or all of the steps of the sequence or flowchart described below, and executes the program. The programs executed by the devices can be installed from an external source. The programs executed by the devices are distributed in a state of being stored in recording media or distributed via a communication line.

Figure 11:
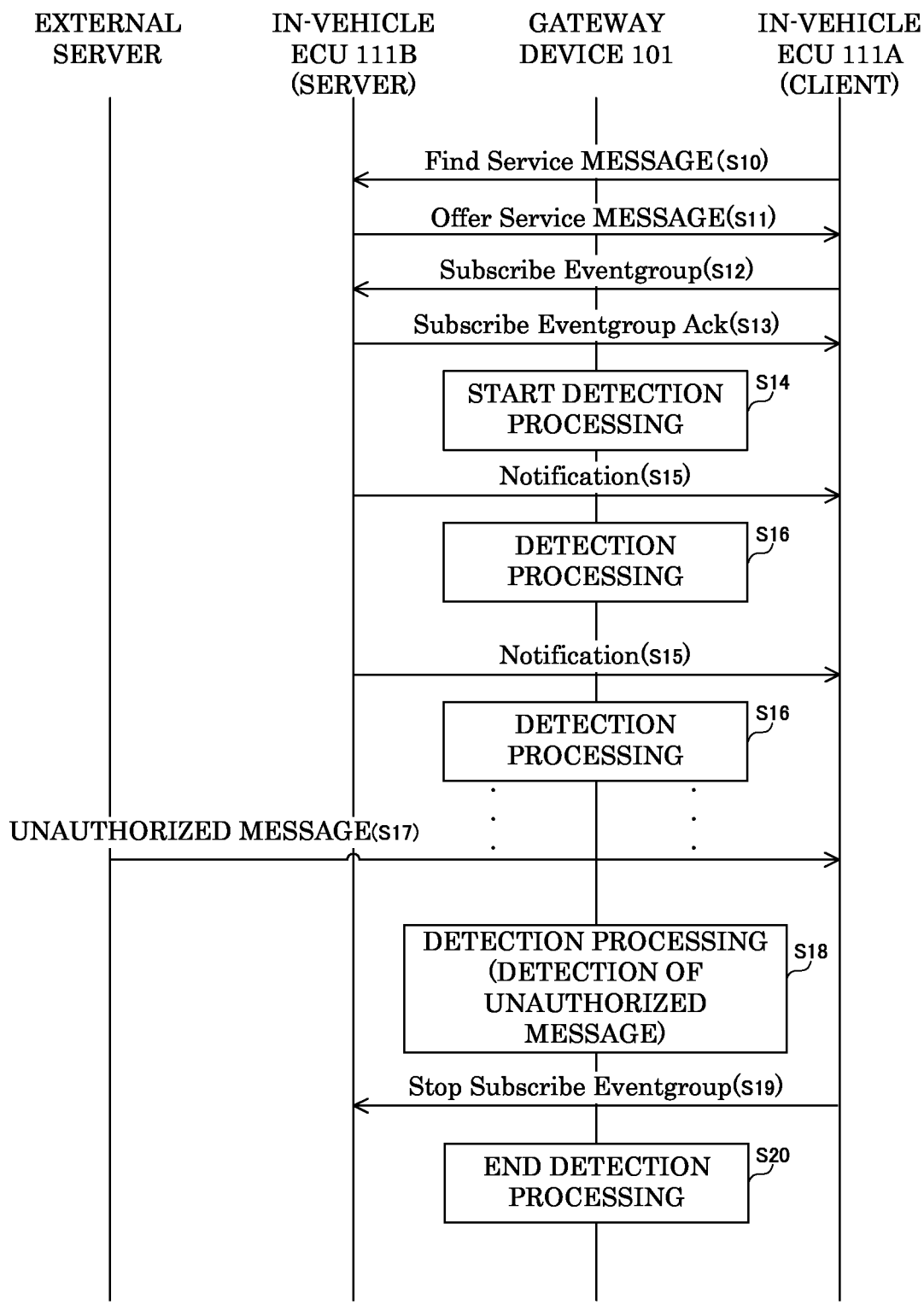
FIG. 11 illustrates a sequence that defines an operation procedure of devices in the case where the gateway device performs unauthorized message detection processing in the in-vehicle network according to this embodiment of the present disclosure.

FIG. 11 illustrates a sequence that defines an operation procedure of devices in the case where the gateway device performs unauthorized message detection processing in the in-vehicle network according to this embodiment of the present disclosure.

As shown in FIG. 11, first, an in-vehicle ECU 111A, which is the client, broadcasts a Find message that incudes the service ID of a service A (step S10). In this case, the gateway device 101 detects that the Find message was transmitted from the in-vehicle ECU 111A.

Next, an in-vehicle ECU 111B capable of providing the service A, as a server, transmits an Offer message to the in-vehicle ECU 111A (step S11). In this case, the gateway device 101 detects that the Offer message was transmitted.

Next, the in-vehicle ECU 111A transmits a Subscribe to the in-vehicle ECU 111B (step S12). In this case, the gateway device 101 detects that the Subscribe was transmitted.

Next, the in-vehicle ECU 111B transmits a Subscribe Ack to the in-vehicle ECU 111A (step S13).

Here, the Subscribe Ack is a stateful message that is transmitted immediately before the start of a periodic state. In this case, the gateway device 101 detects that the Subscribe Ack was transmitted, and starts unauthorized message detection processing (step S14).

Next, the in-vehicle ECU 111B periodically transmits a Notification corresponding to the service A, that is to say a monitored message, to the in-vehicle ECU 111A (step S15).

Next, the gateway device 101 performs unauthorized message detection processing based on the reception status (e.g., reception interval or reception frequency) of frames that include the monitored message (step S16). The transmission of a Notification by the in-vehicle ECU 111B (step S15) and the detection processing performed by the gateway device 101 (step S16) are performed periodically, for example.

Next, a server outside the in-vehicle network 12 transmits an unauthorized message that includes the service ID corresponding to the service A to the in-vehicle ECU 111A (step S17).

Next, the gateway device 101 detects the unauthorized message in the detection processing, and stores information on the unauthorized message and issues a warning, for example (step S18).

Next, the in-vehicle ECU 111A transmits a Stop Subscribe to the in-vehicle ECU 111B (step S19).

Here, the Stop Subscribe is a stateful message that is transmitted immediately before the end of the periodic state. In this case, the gateway device 101 detects that the Stop Subscribe was transmitted, and ends the unauthorized message detection processing (step S20).

Figure 12:
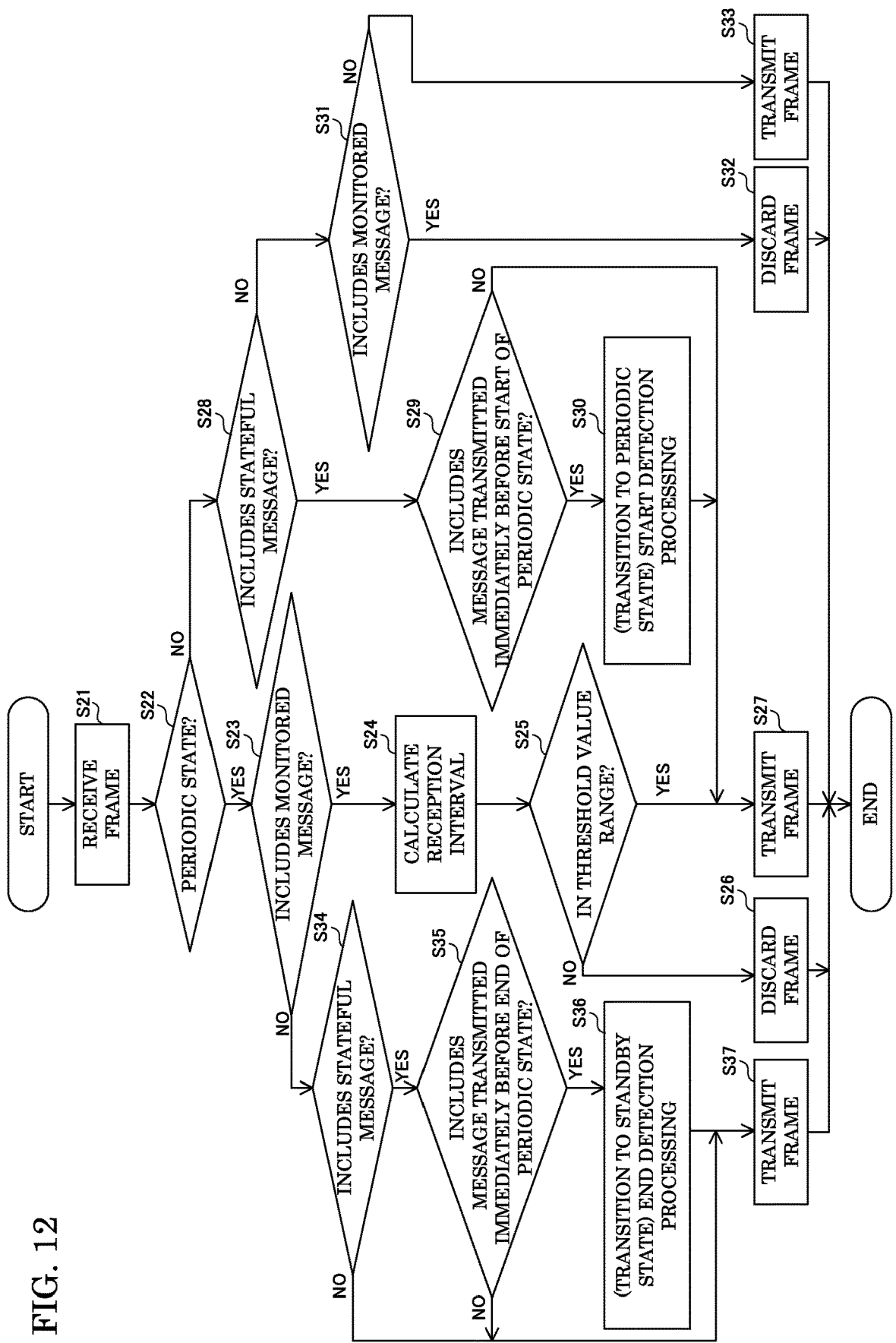
FIG. 12 is a flowchart illustrating an example of an operation procedure of state detection and unauthorized message detection processing performed by the gateway device according to this embodiment of the present disclosure.

FIG. 12 is a flowchart illustrating an example of an operation procedure of state detection and unauthorized message detection processing performed by the gateway device according to this embodiment of the present disclosure. FIG. 12 shows an operation procedure of the gateway device 101 in the above section "Example 1 of Detection Processing" or "Example 3 of Detection Processing", that is to say in the case of performing detection processing based on the reception interval D of frames that include part or all of a monitored message.

As shown in FIG. 12, if a frame that includes a message is received by the relay unit 51 (step S21), the processing unit 53 checks whether or not the state between the transmission source and the relay destination of that message is a periodic state, that is to say a state in which unauthorized message detection processing is being performed (step S22)

Next, if the state is a periodic state ("YES" in step S22), the processing unit 53 checks whether or not the message included in the frame is a monitored message (step S23).

Next, if the message included in the frame is a monitored message ("YES" in step S23), the processing unit 53 calculates the reception interval D for the frame (step S24).

Next, the processing unit 53 checks whether or not the difference between the calculated reception interval D and the transmission period T1 of the corresponding periodic message stored in the storage unit 54 is in a predetermined threshold value range, for example (step S25).

Next, if the difference between the reception interval D and the transmission period T1 is outside the predetermined threshold value range ("NO" in step S25), the processing unit 53 determines that the frame received in step S21 includes an unauthorized message, and instructs the relay unit 51 to discard the frame. The relay unit 51 receives the instruction from the processing unit 53 and discards the frame (step S26).

On the other hand, if the difference between the reception interval D and the transmission period T1 is less than the predetermined threshold value ("YES" in step S25), the processing unit 53 determines that the frame received in step S21 is a normal frame, and does not give a frame discard instruction. The relay unit 51 transmits the frame to the relay destination, which is the client of the service (step S27).

Consider the case where after detecting reception of the frame by the relay unit 51 (step S21), the processing unit 53 detects that the state between the transmission source and the relay destination of the frame is not a periodic state, that is to say detects that the state is a standby state ("NO" in step S22). In this case, the processing unit 53 does not perform unauthorized message detection processing based on the reception status of the frame.

Next, the state detection unit 52, which monitors the status of frame reception by the relay unit 51 in parallel with the processing unit 53, checks whether or not the message included in the frame received by the relay unit 51 is a stateful message (step S28).

Next, if the message is a stateful message ("YES" in step S28), the state detection unit 52 detects whether or not the message is a message that is transmitted immediately before the start of a periodic state (step S29).

Next, if the message is a message that is transmitted immediately before the start of a periodic state ("YES" in step S29), the state detection unit 52 notifies the processing unit 53 that the periodic state will start. Upon receiving the notification that the periodic state will start, the processing unit 53 starts performing unauthorized message detection processing (step S30).

The relay unit 51 transmits the frame received in step S21 to the relay destination, which is the client of the service (step S27).

On the other hand, if the message included in the frame received by the relay unit 51 is not a stateful message ("NO" in step S28), the state detection unit 52 determines that the standby state, which is the current state, will continue, and does not give a notification to the processing unit 53.

In this case, the processing unit 53 checks whether or not the message included in the frame received by the relay unit 51 is a monitored message (step S31).

Next, if the message is a monitored message, that is to say if it is detected that a monitored message was received in the standby state ("YES" in step S31), the processing unit 53 determines that a stateful abnormality has occurred, and instructs the relay unit 51 to discard the frame, for example.

The relay unit 51 receives the instruction from the processing unit 53 and discards the frame (step S32).

On the other hand, if the message is not a monitored message ("NO" in step S31), the processing unit 53 determines that the frame that includes the message is a normal frame, and does not give a frame discard instruction. The relay unit 51 transmits the frame to the relay destination, which is the client of the service (step S33).

Also, in the case where the state between the transmission source and the relay destination of a frame received by relay unit 51 is a periodic state ("YES" in step S22), if the message included in the frame is not a monitored message ("NO" in step S23), the processing unit 53 does not perform unauthorized message detection processing based on the reception status of that frame.

In this case, similarly to step S28 described above, the state detection unit 52, which monitors the reception status of the frame by the relay unit 51 in parallel with the processing unit 53, checks whether the message included in the frame received by the relay unit 51 is a stateful message, for example (step S34).

Next, if the message is a stateful message ("YES" in step S34), the state detection unit 52 checks whether or not the message is a message that is transmitted immediately before the end of the periodic state (step S35).

Next, if the message is a message that is transmitted immediately before the end of the periodic state ("YES" in step S35), the state detection unit 52 notifies the processing unit 53 that the periodic state will end, that is to say the transition to the standby state. Upon receiving the notification of the transition to the standby state, the processing unit 53 ends the unauthorized message detection processing (step S36).

Next, the relay unit 51 transmits the frame received in step S21 to the relay destination, which is the client of the service (step S37).

On the other hand, if the message included in the frame received by the relay unit 51 is not a stateful message ("NO" in step S34), or if the message is a stateful message (in step 34 "YES") but not a message that is transmitted immediately before the end of the periodic state ("NO" in step S35), the state detection unit 52 determines that the periodic state, which is the current state, will continue. In this case, the state detection unit 52 does not give a notification to the processing unit 53. Accordingly, the unauthorized message detection processing performed by the processing unit 53 continues.

The relay unit 51 transmits the frame received in step S21 to the relay destination, which is the client of the service (step S37).

Figure 13:
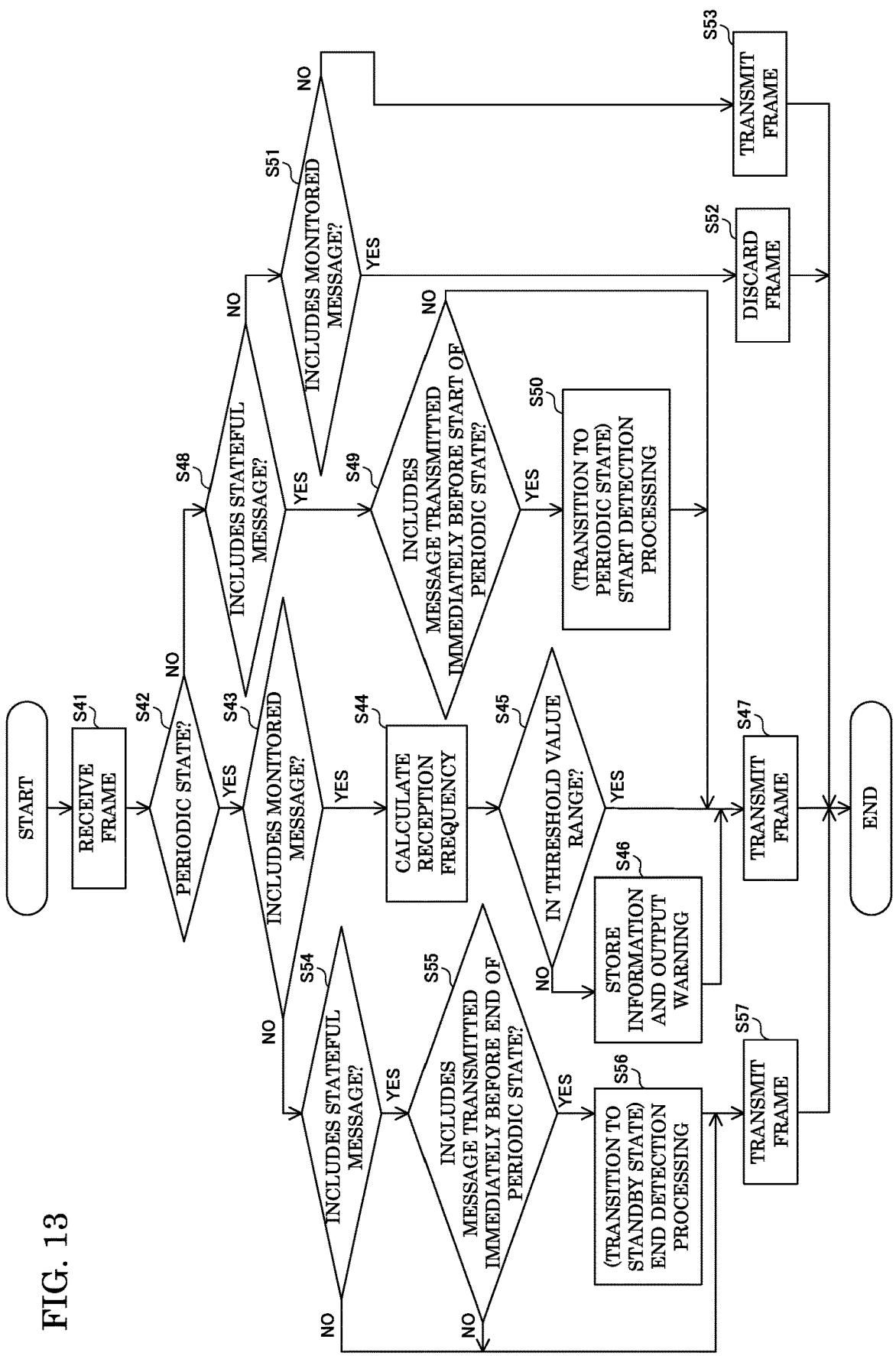
FIG. 13 is a flowchart illustrating an example of an operation procedure of state detection and unauthorized message detection processing performed by the gateway device according to this embodiment of the present disclosure.

FIG. 13 is a flowchart illustrating an example of an operation procedure of state detection and unauthorized message detection processing performed by the gateway device according to this embodiment of the present disclosure. FIG. 13 shows the operation procedure of the gateway device 101 in the above section "Example 2 of Detection Processing", that is to say in the case of performing detection processing based on the reception frequency of frames that include part or all of a monitored message.

As shown in FIG. 13, the operations of steps S41 to S43 are similar to those of steps S21 to S23 shown in FIG. 12, and thus a detailed description for them will not be repeated here.

Next, if the relay unit 51 receives a frame that includes a monitored message ("YES" in step S43), the processing unit 53 calculates the reception frequency of frames that include the monitored message by calculating the number of monitored message frames x received by the relay unit 51 per unit time, for example (step S44).

Next, the processing unit 53 determines whether or not the calculated reception frequency is in a predetermined threshold value range, for example (step S45).

Next, if the calculated reception frequency is outside the predetermined threshold value range, specifically, if the calculated number of frames x is outside the range of the threshold value Th1 or more and less than the threshold value Th2 (in step S45 "NO"), the processing unit 53 determines that an unauthorized message is present, and outputs information regarding the unauthorized message, such as the determination time, to the output unit 55. The output unit 55 stores the information output from the processing unit 53 and outputs a warning, for example (step S46).

Next, the relay unit 51 transmits the frame received in step S21 to the relay destination, which is the client of the service (step S47).

Note that in the case of determining that an unauthorized message is present due to the reception frequency being outside the predetermined threshold value range ("NO" in step S45), the processing unit 53 may instruct the relay unit 51 to discard the frame that includes the unauthorized message. In this case, the relay unit 51 does not perform transmission of the frame (step S47), and instead discards the frame.

On the other hand, if the calculated reception frequency is in the predetermined threshold value range, specifically, if the calculated number of frames x is the threshold value Th1 or more and less than the threshold value Th2 (in step S45 "YES"), the processing unit 53 determines that an unauthorized message is not present.

The relay unit 51 transmits the frame received in step S21 to the relay destination, which is the client of the service (step S47).

The operations of steps S48 to S57 are similar to the operations of steps S28 to S37 shown in FIG. 12, and thus a detailed description for them will not be repeated here.

In the communication device described in WO 2019/021402 A1, an unauthorized message can be detected by comparing the value of a predetermined field included in the message with a determination criterion registered in advance in a list. However, there is a problem that if an unauthorized message satisfying the determination criterion registered in the list is present, that unauthorized message cannot be detected.

In contrast, with the detection device and the detection method according to this embodiment of the present disclosure, the presence of an unauthorized message in an in-vehicle network can be detected more accurately with the configuration and method described above.

The foregoing embodiments are to be construed in all respects as illustrative and not restrictive. The scope of the present disclosure is defined by the claims rather than the description above, and is intended to include all modifications within the meaning and scope of the claims and equivalents thereof.

The above description includes the characteristics listed below.

SUPPLEMENTARY NOTE 1

A detection device that detects presence of an unauthorized message in an in-vehicle network, the detection device includes a state detection unit configured to detect a transition to a state in which a periodic message is transmitted in an in-vehicle network, based on content of a message transmitted in the in-vehicle network; and a processing unit configured to perform detection processing to detect presence of the unauthorized message based on a reception status of a plurality of the periodic messages in the state detected by the state detection unit. The in-vehicle devices in the in-vehicle network perform communication in accordance with a sequence compliant with SOME/IP. In a case where the processing unit detects that the periodic message was transmitted in a standby state in which a transition to the state was not detected by the state detection unit, the processing unit determines that an abnormality occurred in the in-vehicle network. The detection device is connected to a predetermined port of a gateway device provided in the in-vehicle network.

The invention claimed is:

1. A detection device that detects presence of an unauthorized message in an in-vehicle network, the detection device comprising:
    a state detection unit configured to detect a transition to a periodic state, the periodic state being a state in which a periodic message is transmitted in an in-vehicle network, wherein each message transmitted in the in-vehicle network includes a frame having a header and the transition to the periodic state is determined when the header of the message includes specific content that is transmitted immediately before the start of periodic messages between a client and a server; and
    a processing unit configured to perform detection processing to detect presence of the unauthorized message based on a reception status of a plurality of the periodic messages in the state detected by the state detection unit, the reception status being one of a reception interval or a reception frequency in which the periodic messages are received.

2. The detection device according to claim 1, wherein in the detection processing, the processing unit detects the unauthorized message when the reception interval of the periodic messages is beyond a predetermined threshold.

3. The detection device according to claim 2, wherein in the detection processing, the processing unit calculates a difference between the reception interval and a transmission period corresponding to the periodic message for each type of the periodic message, and, in a case where the calculated difference is greater than or equal to a predetermined threshold value, the processing unit determines that the unauthorized message is present.

4. The detection device according to claim 3, wherein the threshold value is set based on variation in a transmission period of the periodic messages analyzed based on a measurement result in a vehicle in which the in-vehicle network is provided.

5. The detection device according to claim 2,
    wherein the periodic message can be divided and transmitted in a plurality of frames in the in-vehicle network, and
    the processing unit detects the unauthorized message based on a reception interval of frames at the same place in a division sequence.

6. The detection device according to claim 1, wherein the processing unit performs the detection processing based on the reception frequency of frames that include part or all of the periodic message.

7. The detection device according to claim 1, further including:

a relay unit configured to relay a message between a plurality of in-vehicle devices in the in-vehicle network, wherein the relay unit does not relay the unauthorized message detected by the processing unit.

8. The detection device according to claim 1, wherein the state detection unit detects the transition to the state, in a case where a specific message was received, and the specific message is a message compliant with SOME/IP (Scalable service-Oriented MiddlewarE over IP).

9. The detection device according to claim 1, further including:

an output unit configured to perform at least one of storing information regarding the unauthorized message and outputting a warning, in a case where presence of the unauthorized message was detected by the processing unit.

10. A detection method performed in a detection device that detects presence of an unauthorized message in an in-vehicle network, the detection method comprising the steps of:

detecting a transition to a periodic state, the periodic state being a state in which a periodic message is transmitted in an in-vehicle network, wherein each message transmitted in the in-vehicle network includes a frame having a header and the transition to the periodic state is determined when the header of the message includes specific content that is transmitted immediately before the start of periodic messages between a client and a server; and detecting presence of the unauthorized message based on a reception status of a plurality of the periodic messages in the detected state, the reception status being one of a reception interval or a reception frequency in which the periodic messages are received.

11. A computer program product for use in a detection device configured to detect unauthorized messages in an in-vehicle network, the computer program product comprising a non-transitory, machine-readable medium storing instructions which, when executed by at least one programmable processor, causes the at least one programmable processor to perform operations comprising:

detecting a transition to a periodic state, the periodic state being a state in which a periodic message is transmitted in an in-vehicle network, wherein each message transmitted in the in-vehicle network includes a frame having a header and the transition to the periodic state is determined when the header of the message includes specific content that is transmitted immediately before the start of periodic messages between a client and a server; and a processing unit configured to perform detection processing to detect presence of the unauthorized message based on a reception status of a plurality of the periodic messages in the state detected by the state detection unit, the reception status being one of a reception interval or a reception frequency in which the periodic messages are received.

* * * * *